April 1, 1969   M. DYRE   3,436,601
PROTECTION CIRCUITS FOR SIGNALLING LINES
Filed June 29, 1965
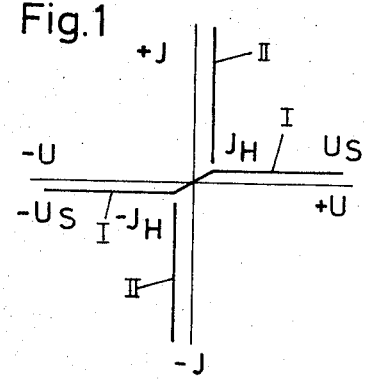
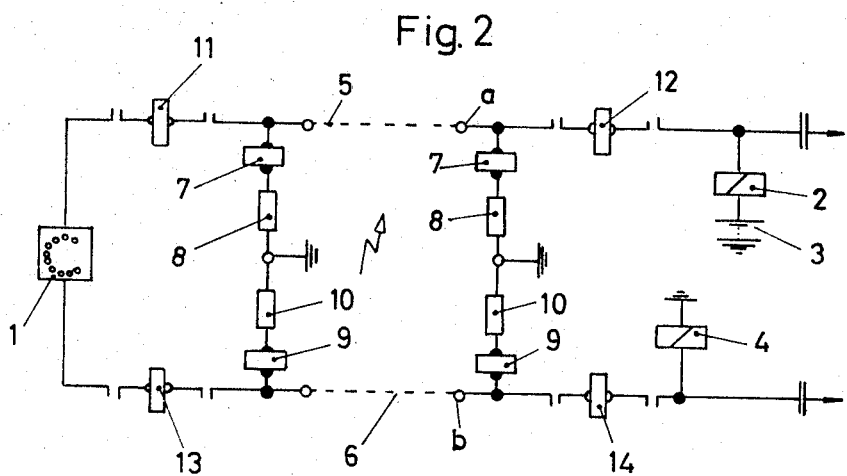

United States Patent Office 3,436,601
Patented Apr. 1, 1969

3,436,601
PROTECTION CIRCUITS FOR
SIGNALLING LINES
Morgens Dyre, Gildbro, Nordborg, Denmark, assignor to Danfoss A/S, Nordborg, Denmark, a company of Denmark
Filed June 29, 1965, Ser. No. 467,964
Claims priority, application Germany, July 3, 1964,
D 44,837
Int. Cl. H02h 1/04
U.S. Cl. 317—61.5               1 Claim

ABSTRACT OF THE DISCLOSURE

Protective circuit in which junctionless, nonrectifying, solid state switching elements are connected between conductors of a transmission line with ground connections to pass to ground transient voltage surges. Others of the switching elements are connected in series in the conductors to protect a substation set between the conductors. Each of the switching elements has a resistance and on application of a voltage exceeding a threshold value switches from a high-resistance to a low-resistance condition and when the current flowing through it falls below a predetermined holding value reverts to its high resistance condition. Resistors connected in series with the switching elements, at normal operating voltage and with the switching elements in their low-resistance condition, limit the current flow therethrough to a level below the holding value.

---

The present invention relates to a protection circuit for signalling lines and more particularly to a protection circuit for telephone lines, to prevent damage due to sudden overvoltage conditions, such as may arise due to lightning, induced voltages from neighboring power lines and the like.

Most communication lines, for example telephone lines, under ordinary operating conditions have a potential of at the most 30 volts against ground, that is 60 volts between conductors if the ground is taken as a center neutral connection. Due to atmospheric disturbances, such as thunder storms, lightning, or due to breakage of wires and inadvertent contact with power lines, overvoltages may arise within the communication lines. In order to prevent damage to connected equipment, overvoltage protective devices such as spark gap discharging units, glow lamps with noble gases, mica flakes between carbon electrodes and the like are used. All these devices have some disadvantages, either due to their cost, necessity for replacement after use and the like.

It is an object of the present invention to provide a protective device for signalling circuits and particularly for telephone circuits which has a long period of life, does not need to be replaced after having conducted overvoltage peaks, and can be manufactured with close performance tolerances to effectively protect the circuit against any voltages in excess of rated voltage.

Briefly, in accordance with the present invention, signalling lines can be protected by including therein a solid state switching element which has the property that, when a certain voltage in excess of the threshold potential is exceeded, it switches from a very high resistance of several megohms to a low resistance value of about an ohm or so; and, when the current therethrough drops below a certain holding value, it again resumes its high resistance state. Such a device is connected between the lines and ground. It is very simple to manufacture such devices and to accurately adjust the threshold value to be just above the normal line-ground voltage. A resistor is included in series with this element; the resistor is so dimensioned that the current through the element and the resistor, when the element is in its low resistance state, due to the line potential itself under normal operating condition, is below the holding current value.

In order to protect against overcurrent, a solid state switching element utilizing different components of materials can be made, which, normally has a low resistance value; but, when the current therethrough exceeds a certain value assumes a high resistance state; and, when the voltage is placed thereacross, can be regenerated to have its low resistance value. Such devices have to be distinguished from fuses which, under ordinary conditions, of course are low resistance; when burned out, they may be considered to have a high resistance. Fuses cannot be regenerated, whereas the elements used in the present invention can be regenerated by applying a regeneration potential pulse across the element.

A particularly interesting device which switches from a high resistance state to a low resistance state when a threshold potential thereacross is exceeded, is made from a polycrystalline base substance of tellurium, with additives taken from Groups IV and V of the Periodic Table of Elements. As an example, a solid state switch may consist of approximately 67.5% tellurium, 25% arsenic, and 7.5% germanium, made by vapor depoistion or evaporation on a metal plate, by sintering, or by solidification of an alloy melt. The resulting switching elements are absolutely symmetrical, have a high current carrying capacity, and are easily manufactured. Their internal resistance can change from several megohms to one ohm or less. The switching threshold potential of such voltage sensitive elements can readily be selected by choice of the relative ratio of components, or by appropriate choice of the thickness of the body.

A device which is normally of low resistance and changes, when a threshold value of current is exceeded to a high resistance, can be made similarly to the switching element previously described.

This device can be made with an element which consists of tellurium and germanium, for example 50% tellurium and 50% germanium, or 90% tellurium and 10% germanium. It can be regenerated by a high voltage pulse, for example a condenser discharge, after having reached its high resistance condition due to excessive current.

The structure, organization and operation of the invention will now be described more specifically in the following detailed description with reference to the accompanying drawings, in which:

FIG. 1 is a typical voltage (abscissa) vs. current-(ordinate) diagram for a voltage sensitive solid state switching element for use in the present invention; and FIG. 2 is a circuit according to the present invention showing, schematically, protection of a telephone system.

FIG. 1 illustrates, diagrammatically, a current J through a symmetrical voltage sensitive solid state switching element, having a voltage U applied thereacross. Below the threshold potential $\pm U_S$, the current is practically zero since the element is in its high resistance state, in which its resistance is up to several megohms (curve I). As soon as the switching threshold potential is exceeded, the switching element changes to its low resistance state (curve II), in which its resistance may be one ohm or less. The current through the switch is then essentially determined only by the resistance of the remainder of the circuit. The element remains in the low resistance state until the current therethrough decreases below the holding value $J_H$. The element then changes back to its high resistance state.

FIG. 2 shows, highly schematically, a telephone line to a subscriber. Telephone lines $a$, $b$ have subscriber stations 1, schematically indicated, connected thereto. At the central, they are connectable by means of relays 2, 4, supplied by a central battery 3. The connection between the central and the subscriber station is by means of connecting lines 5, 6, shown dashed in the drawings.

In order to protect the communication lines, that is the telephone lines 5, 6, against high voltage, each side of the lines a, b have solid state switching elements 7, 9, in series with resistances 8, 10, connected between the line and ground. Normally, the solid state switching elements 7, 9 are in a high resistance state. If the potential on any one line against ground exceeds the normal operating potential, for example as supplied by battery 3, and as schematically indicated by the lightning arrow in FIG. 2, the elements will switch to their low resistance state as soon as the threshold potential $U_S$ is exceeded. Resistances 8 and 10 are so dimensioned, that under normal operating conditions, that is when only the battery 3 supplies current, the current through the switching element 7 is less than the holding value of the current $J_H$. Thus, as soon as the potential due to a disturbance such as lightning is removed, the element switches back to its high resistance state.

In order to protect both the central equipment, and the subscriber station against excessive currents, additional protection is desirable. Solid state switching units 11, 12, 13, 14 are placed in series with the line. These units are normally in their low resistance states; however, when current in excess of a certain threshold value is passed therethrough, they change to a high resistance state thus, for all practical effect, isolating the central equipment or the subscriber station 1, respectively, from the line. After operation, a regenerating potential applied across these units will bring them back into their low voltage, normal state.

Solid state switching units 11, 12, 13, 14 consist of tellurium with an additive formed by an element of Group IV of the Periodic Table of Elements, for example germanium, in the range of 50–90% tellurium and 50–10% germanium.

I claim:

1. Means for preventing voltage surges on a telephone transmission line from reaching a subscriber's substation set comprising, a plurality of junctionless, nonrectifying, solid state switching elements connected between conductors of said transmission line, connections intermediate said conductors connecting said switching element to ground thereby to discharge voltage surges to ground, each of said elements having a resistance which on application of a voltage exceeding a threshold value switches from a high-resistance condition to a low-resistance condition, and when the current flowing through it falls below a predetermined holding value reverts to said high resistance condition, others of said junctionless; nonrectifying, solid state switching elements connected in said conductors in series with said substation set, and resistors connected in series with said switching elements which, at normal operating voltage and with the switching elements in their low-resistance condition, limit the current flow therethrough to a level below said holding value.

References Cited

UNITED STATES PATENTS

| 2,896,128 | 7/1959 | Fuller et al. | 317—61 |
| 3,210,641 | 10/1965 | Hutson | 307—258 X |
| 3,271,591 | 9/1966 | Ovshinsky | 307—258 |
| 2,789,254 | 4/1965 | Bodle et al. | 179—184 |
| 3,181,033 | 4/1965 | Bakker | 317—61 |

WILLIAM C. COOPER, *Primary Examiner.*

U.S. Cl. X.R.

179—184